United States Patent
Li

(10) Patent No.: US 10,037,152 B2
(45) Date of Patent: Jul. 31, 2018

(54) METHOD AND SYSTEM OF HIGH-THROUGHPUT HIGH-CAPACITY STORAGE APPLIANCE WITH FLASH TRANSLATION LAYER ESCALATION AND GLOBAL OPTIMIZATION ON RAW NAND FLASH

(71) Applicant: Alibaba Group Holding Limited, George Town (KY)

(72) Inventor: Shu Li, Bothell, WA (US)

(73) Assignee: Alibaba Group Holding Limited, Cayman Islands (KY)

( * ) Notice: Subject to any disclaimer, the term of this patent is extended or adjusted under 35 U.S.C. 154(b) by 0 days.

(21) Appl. No.: 15/383,046

(22) Filed: Dec. 19, 2016

(65) Prior Publication Data

US 2018/0173434 A1    Jun. 21, 2018

(51) Int. Cl.
G06F 3/06 (2006.01)
G06F 12/10 (2016.01)
G06F 13/40 (2006.01)
G06F 13/42 (2006.01)

(52) U.S. Cl.
CPC ............ *G06F 3/0613* (2013.01); *G06F 3/065* (2013.01); *G06F 3/067* (2013.01); *G06F 3/0688* (2013.01); *G06F 12/10* (2013.01); *G06F 13/4068* (2013.01); *G06F 13/4282* (2013.01); *G06F 2212/7201* (2013.01); *G06F 2213/0026* (2013.01)

(58) Field of Classification Search
None
See application file for complete search history.

(56) References Cited

U.S. PATENT DOCUMENTS

| 8,219,776 | B2 | 7/2012 | Forhan |
| 2008/0189485 | A1 | 8/2008 | Jung |
| 2010/0180071 | A1 | 7/2010 | Hsu |
| 2011/0307647 | A1* | 12/2011 | Stalzer ............ G06F 12/0866 711/103 |

OTHER PUBLICATIONS

Kang et al., "A Superblock-based Flash Translation Layer for NAND Flash Memory", from the Computer Science Division at Korea Advanced Institute of Science and Technology (KAIST), Oct. 22-25, 2006.
Park et al., "A Reconfigurable FTL (Flash Translation Layer) Architecture for NAND Flash-Based Applications", from Korea Advanced Institute of Science and Technology, Jul. 2008.

* cited by examiner

*Primary Examiner* — Kevin Verbrugge
(74) *Attorney, Agent, or Firm* — Van Pelt, Yi & James LLP

(57) ABSTRACT

A programmable circuit coupled to a plurality of NAND Flashes performs one or more logic functions associated with storage operations performed on the plurality of NAND Flashes. A set of one or more processors perform one or more translations between one or more logical addresses and one or more physical addresses in response to a request to access the plurality of NAND Flashes. A communication interface coupled to the programmable circuit transfers data destined to or originating from the plurality of NAND Flashes.

22 Claims, 7 Drawing Sheets

METHOD AND SYSTEM OF HIGH-THROUGHPUT HIGH-CAPACITY STORAGE APPLIANCE WITH FLASH TRANSLATION LAYER ESCALATION AND GLOBAL OPTIMIZATION ON RAW NAND FLASH

BACKGROUND OF THE INVENTION

Data centers, such as those which store information for large e-commerce companies store massive amounts of data. Maintenance issues, especially ones which require a technician to go to the data center and resolve the issue, are expensive and/or time consuming for the data center and/or the e-commerce company for which data is stored. New storage devices which require less maintenance would be desired. It would also be desirable if such storage devices cost less money and/or supported a variety of applications.

BRIEF DESCRIPTION OF THE DRAWINGS

Various embodiments of the invention are disclosed in the following detailed description and the accompanying drawings.

DETAILED DESCRIPTION

Figure 1:
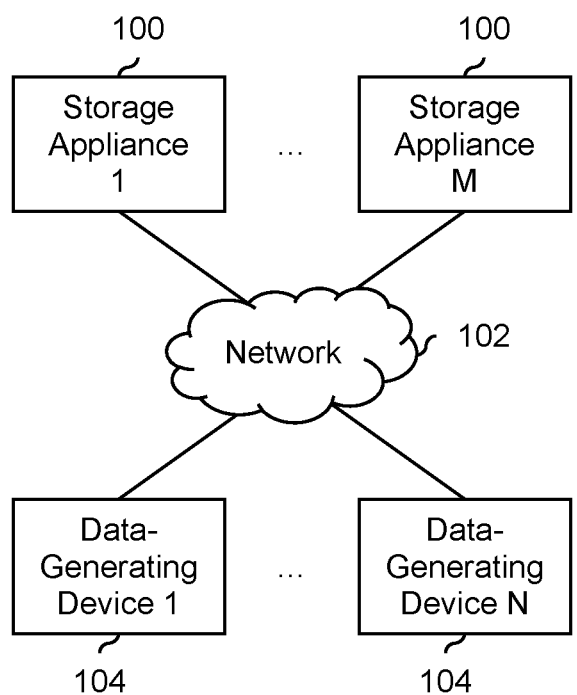
FIG. 1 is a diagram illustrating an embodiment of a plurality of storage appliance which are accessible via a network.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Various embodiments of a storage appliance are described herein. The storage appliance includes a plurality of NAND Flashes, for example on a plurality of add-in cards. Unlike some other storage systems, the NAND Flashes does not have local processors or local processor storage (e.g., which locally performs background and/or management operations, manages Flash translation layer (FTL) information, etc.). Instead, the FTL is managed (e.g., centrally) by a set of one or more (e.g., shared) processors in the storage appliance which are configured to manage FTL mapping or translation (e.g., translation between logical address(es) and physical address(es)) (e.g., so that FLT information is managed at the host level). The storage appliance in some embodiments also includes a programmable circuit which performs logic functions associated with storage operations performed on the plurality of NAND Flashes. For example, this may permit those logic operations to be performed quickly and some example logic operations include compression, deduplication, RAID related operations, an interface to the NAND Flash, or erasure coding. The storage appliance in some embodiments also includes a communication interface which transfers data to or from the NAND Flashes (e.g., a network interface card). In some embodiments, the storage appliance is a "box" which is connected to the network (e.g., via an Ethernet connection) and read and write instructions are received from remote data-generating devices via the network connection.

FIG. 1 is a diagram illustrating an embodiment of a plurality of storage appliance which are accessible via a network. In the example shown, a plurality of storage appliances (100) are accessible via a network (102) to data-generating devices which require storage (104). For example, the data-generating devices may be servers, such as a server which performs transactions, and the transactional information generated by the servers (e.g., buyer information, seller information, details about the item(s) being purchased, etc.) is stored on the storage appliances. Naturally, storage appliances may be used in a variety of applications and/or in combination with a variety of devices which generate data which needs to be stored.

As will be described in more detail below, the storage appliance embodiments described herein are designed to reduce the amount of human intervention required for maintenance. The following figure describes one embodiment of a storage appliance in more detail.

Figure 2:
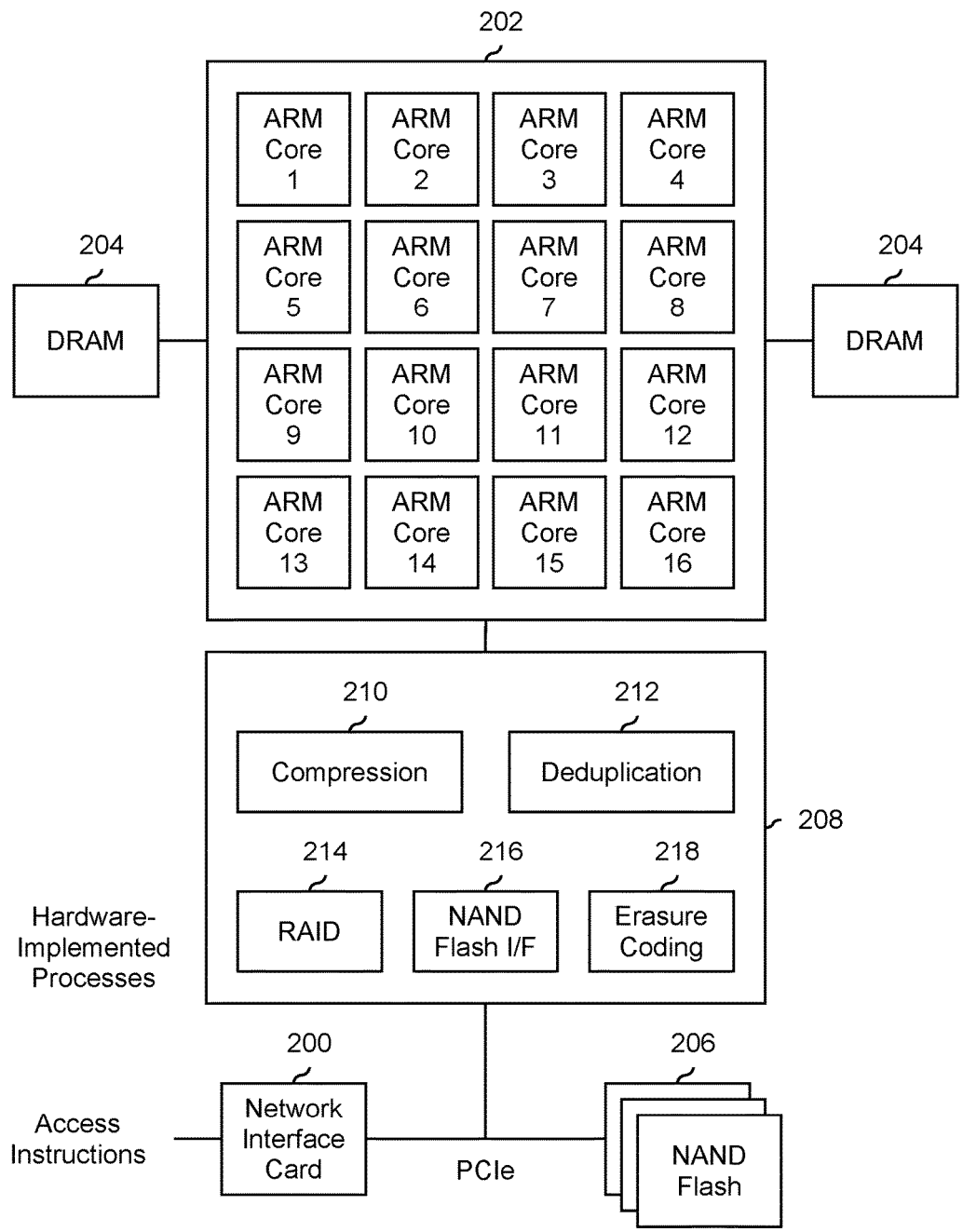
FIG. 2 is a diagram illustrating an embodiment of a storage appliance, including functional blocks.

FIG. 2 is a diagram illustrating an embodiment of a storage appliance, including functional blocks. In some embodiments, the storage appliances (100) from FIG. 1 are implemented as shown.

Access instructions (e.g., instructions to read data from or write data to NAND Flash 206) are received by a network interface card (NIC) (200). For example, these access instructions may come from data-generating devices 104 in FIG. 1. The access instructions are passed from NIC 200 to a collection of central processing units (CPUs), in this case ARM cores (202). For simplicity, in this example a single ARM core handles the exemplary access instruction being processed. Although this example shows 16 ARM cores, in other embodiments some other number of ARM cores is used.

Before continuing with the example of how an access instruction is handled, it may be useful to discuss DRAM (204). In this example, the DRAM is connected to the ARM cores and is used by the ARM cores to store information. A more general term for DRAM is processor storage (e.g., storage for the use of the processor, for example in which to temporarily store write data before the write data is written to NAND Flash). In one example, the ARM cores use the DRAM to store Flash Translation Layer (FTL) information. Generally speaking, FTL information includes mappings between logical (block) addresses (e.g., included in a read or write instruction issued by data-generating device 104 in FIG. 1) and a physical (block) address (e.g., where the data is actually stored in NAND Flash 206). If a write instruction is received, new mapping information is stored in the FTL information in the DRAM. Or, if a read instruction is received, the FTL information stored in the DRAM is accessed in order to know what part of the NAND Flash to read in order to perform the read operation. In some embodiments, other types of information are stored by the ARM cores in the DRAM (e.g., state information, the last time wear leveling and/or garbage collection was performed, etc.). In some embodiments, the DRAM includes double data rate (DDR) DRAM and/or expandable DRAM.

Using a write instruction as an example, the ARM core decides where to store the write data and creates a new entry with the new logical to physical mapping in the FTL information stored in the DRAM. Hardware-implemented processes (208) then assist the ARM core in writing to the NAND Flash because in addition to "basic" storage, other features and services are supported including compression (e.g., compressing the data before it is actually stored on NAND Flash 206), deduplication (e.g., identifying and eliminating duplicate data so that duplicate data is not unnecessarily stored on NAND Flash 206), redundant array of independent disks (RAID) related processing (e.g., to provide redundancy protection), and erasure coding (to detect erasures when data is read back from NAND Flash 206). To that end, the storage appliance includes compression 210, deduplication 212, RAID 214, and erasure coding 218 modules. For example, the write data is encoded with RAID and erasure encoding and is distributed over multiple AIC. A read operation is handled in a similar manner with the assistance of the hardware-implemented processes.

The operations described above are performed frequently and are faster when implemented in hardware and are therefore implemented in hardware in this example. As such, blocks 210-218 are included in a block called hardware-implemented processes and are implemented in hardware (e.g., a field-programmable gate array (FPGA)). The hardware-implemented processes also includes a NAND Flash interface (216) which manages communication with NAND Flash 206. In this example, the NAND Flash has on the order of hundreds of gigabytes of storage.

In this example, the NIC, hardware-implemented processes, and NAND Flash communicate via Peripheral Component Interconnect Express (PCIe). In some embodiments, the hardware-implemented processes and ARM cores communicate via PCIe (not shown here).

Naturally, the functional blocks shown may be implemented in any manner desired. In one example, the hardware-implemented processes and ARM cores are implemented on a single device, such as a system on a chip (SoC). In another example, the ARM cores are on one device (e.g., one semiconductor) and the hardware-implemented processes are on another device (e.g., a different semiconductor).

The exemplary storage appliance shown is that it requires less human intervention for maintenance. This is because fewer (but more powerful) ARM cores are used compared to some other storage systems (e.g., with comparable total amounts of storage). For example, to save money, the ARM cores used in those other storage systems tend to be less powerful ARM cores (e.g., because there are a total of 200-300 ARM cores in those other systems versus 16 ARM cores, so cost is an important consideration). Some firmware instructions may cause less powerful ARM cores to freeze or hang and by using stronger or more powerful ARM cores, the likelihood of this storage appliance hanging or freezing is reduced, which in turn makes the storage appliance easier to maintain.

It is also easier to write firmware for the storage appliance and the firmware written is likely to have fewer bugs. Writing firmware which can run on 200-300 ARM cores is more difficult than writing firmware which can run on 16 ARM cores. Also, it is easier to test firmware for 16 ARM cores and the firmware is more likely to be bug free (which again makes the storage appliance easier to maintain).

In addition to responding to access instructions (e.g., from some data-generating device), the ARM cores in the exemplary storage appliance manage background and/or management operations, such as wear leveling and/or garbage collection. For example, the ARM cores are configured to determine when to perform wear leveling and/or garbage collection and select or otherwise identify which NAND Flash block(s) are the input or source block(s) and which NAND Flash block(s) are the output or destination block(s). For example, wear leveling and/or garbage collection may be performed when the number of free blocks is below some threshold (e.g., since performing wear leveling and/or garbage collection frees up blocks) and blocks which have relatively little wear (e.g., compare to other blocks in the system) and/or which have a relatively low amount of valid data in them may be identified as good input or source blocks for wear leveling and/or garbage collection.

In this example, wear leveling is performed by having the ARM cores track a wear or health metric for all of the NAND blocks (e.g., where each Flash die includes multiple blocks). For example, a healthy metric for a block can be determined from the number of corrected bits (e.g., when a read of that block is performed and decoding is performed, the decoding process will return a number of corrected bits). The more bits that need to be corrected, the less healthy and more worn out that block is. Then, as writes to NAND Flash are performed (e.g., in response to write instructions from an application and/or data-generating device, or as part of a background management process to copy data from one part of the NAND Flash to another), the ARM cores select blocks to write to that are healthier or less worn out compared to the other blocks.

Garbage collection is the process by which any remaining valid data in a block is consolidated into a new block so that the source block can be freed up for a new write. In some embodiments, garbage collection and wear level are performed at the same time or are otherwise combined (e.g., source and/or destination blocks are selected with both objectives in mind).

The exemplary storage appliance has the ability to perform wear leveling and/or garbage collection globally. Some other storage systems divide up their NAND Flash into groups where each group has its own set of local ARM core(s) which manages wear leveling and/or garbage collection locally (e.g., only within that group of NAND Flash). (Conceptually, the ARM cores in the storage appliance shown here may be thought of as global or centralized ARM cores as opposed to local or distributed ARM cores.) Performing wear leveling and/or garbage collection locally is not optimal because the best combination of source block(s) and destination block(s) when performing wear leveling and/or garbage collection may be in two different groups of NAND Flash and the local ARM core(s) do not communicate with each other. In contrast, because the storage appliance does these operations globally, they can be optimized globally.

Further, the exemplary storage appliance has reduced cost. Fewer ARM cores are used (e.g., 16 versus 200-300) so even though those ARM cores may be more powerful and therefore more expensive, the total cost of the ARM cores is still lower. Similarly, because centralized pool of DRAM is used, less total DRAM is used. In other systems where each SSD has its own set of ARM cores and DRAM, terabytes worth of DRAM is used, which is expensive. In contrast, the exemplary storage appliance has on the order of hundreds of gigabytes of DRAM.

The following figure shows a storage appliance with hierarchical and implementation details.

Figure 3:
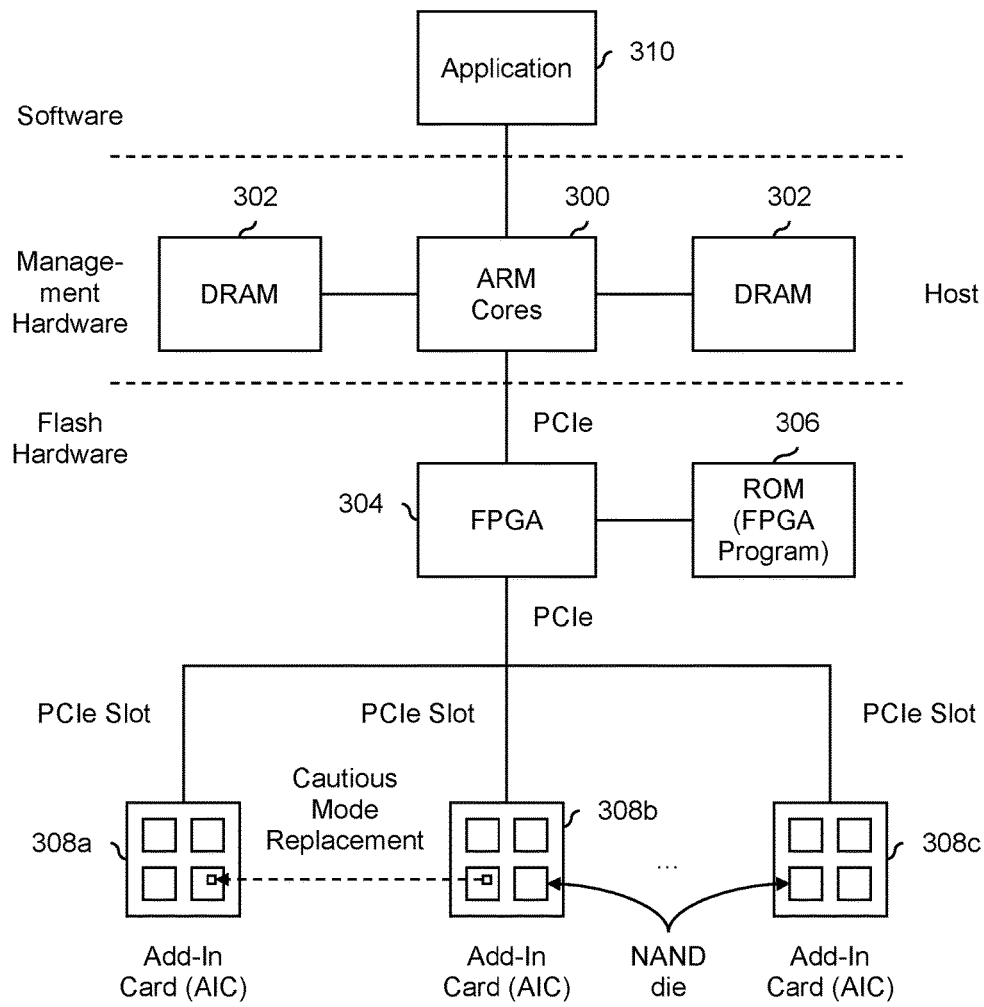
FIG. 3 is a diagram illustrating an embodiment of a storage appliance, including hierarchical details.

FIG. 3 is a diagram illustrating an embodiment of a storage appliance, including hierarchical details. In the example shown, a storage appliance similar to the one in FIG. 2 is shown but hierarchical aspects of the storage appliance illustrated. As shown in this figure, the ARM cores (300) and DRAM (302) are at the host level. For readability, a single block is used to represent the ARM cores but ARM cores 300 includes 16 ARM cores as shown in FIG. 2.

Below the host is FPGA 304 and ROM 306. The ARM cores (which are part of the host) communicate via PCIe with the FPGA. In this example, the FPGA corresponds to the hardware-implemented processes (208) from FIG. 2. The FPGA program used to program the FPGA is stored on the ROM. In some embodiments, the ROM is a negative OR (NOR) ROM.

At the next level below the FPGA and ROM is the NAND Flash (308). In this example, the NAND Flash communicates with the FPGA via PCIe. In this example, the NAND Flash are implemented as add-in cards (AIC) which are inserted into PCIe slots to connect to the PCIe connection. Each AIC includes multiple NAND die and to preserve the readability of the figure only four NAND die are shown per AIC in this example. In some embodiments, a storage appliance has hundreds of NAND die where each NAND die has 256 MB of storage.

In some other systems, FTL information is managed locally by local ARM core(s) for a corresponding group of NAND Flash. This is problematic for the following reason. In a busy data center, it was observed that a non-negligible number of existing solid state drives (SSDs) became read-only much sooner than expected. Further investigation revealed that one of the main causes for this is that all (or at least most) of the free blocks in one NAND die run out. When all of the redundant blocks in one NAND die are used up, that die is designated as read-only. Once one of the NAND dies in the SSD becomes read-only, limitations to the RAID protection will force that SSD (which includes read-only NAND die) to also become read-only. A read-only SSD is not very useful and therefore the read-only SSD is replaced. This includes the time consuming task of having a technician to work in the data center to replace the SSD in order to read out the data from the read-only SSD and rewrite that data into the new SSD.

In contrast, the example storage appliance avoids this problem by performing bad block management in the following manner. From the host's point of view, there are hundreds of NAND dies. When one NAND die's free block count is below a threshold (e.g., which is predetermined to ensure the reliability of each AIC), that die is put into a cautious mode which means that any new emerging bad blocks (or, more generally, any block where data is copied off of that block) will be replaced with a free block from another NAND die. In some cases, the target NAND die could be on a different AIC in the storage appliance (see, e.g., the replacement from AIC 308b to AIC 308a). This extends prevents the NAND dies from becoming read-only prematurely, which in turn extends the lifetime of the storage appliance and makes the storage appliance easier to maintain (e.g., because a technician is not require to manually intervene in order to swap out a bad part).

The following figure describes this process more formally in a flowchart.

Figure 4:
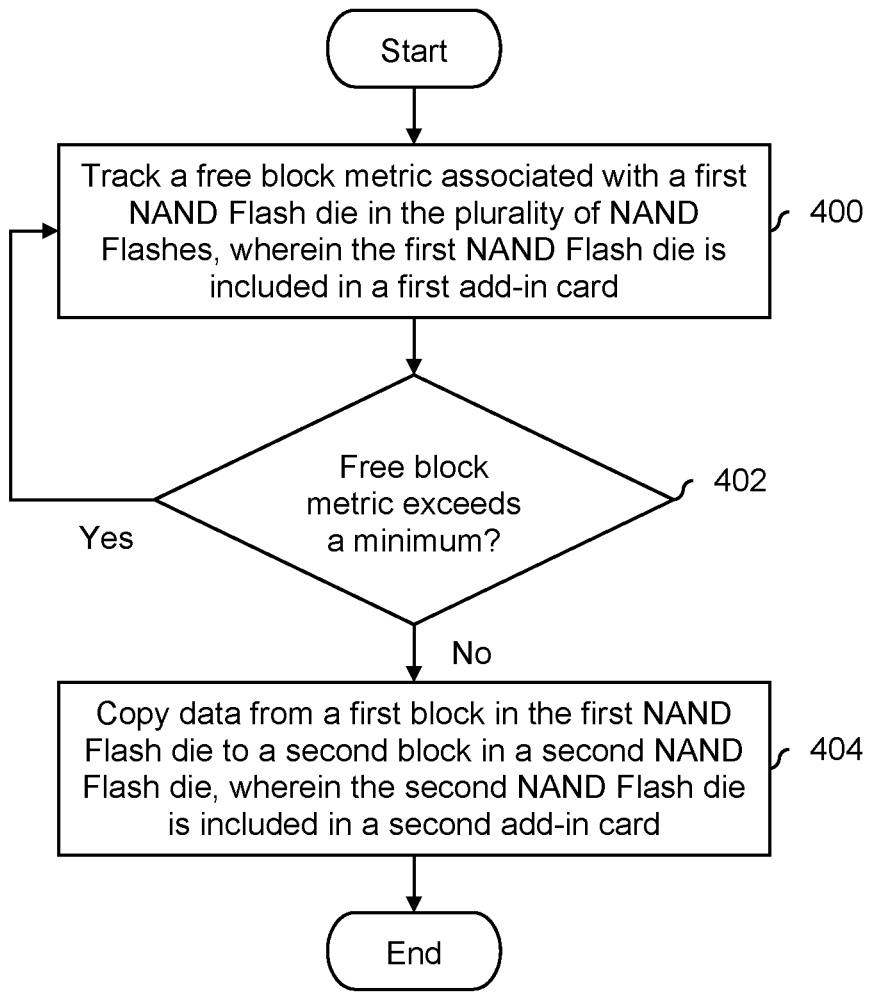
FIG. 4 is a flowchart illustrating an embodiment of a block management process.

FIG. 4 is a flowchart illustrating an embodiment of a block management process. In some embodiments, the process is performed by ARM cores 202 in FIG. 2 or ARM cores 300 in FIG. 3. In various embodiments, the process is performed during or is otherwise associated with wear leveling, garbage collection, and/or bad block management.

At 400, a free block metric associated with a first NAND Flash die in the plurality of NAND Flashes is tracked, wherein the first NAND Flash die is included in a first add-in card. For example, the free block metric may be a number of free blocks for that Flash die or a percentage of free blocks for that Flash die. In some embodiments, a free block metric is generated or otherwise determined from FTL information (e.g., which the ARM cores manage and therefore have access to). In addition to tracking which blocks are used to store application data (e.g., from a data-generating device), the FTL information may record which blocks are bad. From this, the number of free blocks for a given Flash die may be determined. For example, the following equation can be used to make the determination:

<number of free blocks in die>=<number of total blocks in die>−<number of used blocks in die>−<number of bad blocks in die>

At 402, it is determined if the free block metric exceeds a minimum. If so, the process continues tracking the free block metric at step 400. That is, so long as a given Flash die has at least the minimum percentage or number of free blocks, the free block metric is monitored.

If, however, the free block metric does not exceed the minimum at step 402 (that is, the Flash die has too few free blocks), then at 404 data from a first block in the first NAND Flash die is copied to a second block in a second NAND Flash die, wherein the second NAND Flash die is included in a second add-in card. In one example, the first block is a bad block and step 402 is used to copy data off of the bad block to a good block, in this case on a different Flash die. In another example, the copying is part of wear leveling and the source block (i.e., the first block) and/or the destination block (i.e., the second block) have been selected as good source and destination candidates by the wear leveling process (e.g., the first/source block is less worn out compared to other blocks and the wear leveling process wants to free up that block so it can be undergo more wear). In another example, the copying is part of garbage collection where valid data from the source block (i.e., the first block)

and the destination block (i.e., the second block). For example, the garbage collection process may select the first/source block because most of its data has become out-of-date or otherwise invalid.

It is noted that step 404 recites a feature or ability that some other storage systems may not be able to do. As described above, in some other storage systems, the AICs and/or SSDs do not talk to each other and so data from a block on one Flash die cannot be copied to a block on another Flash die. It is also noted that step 404 does not automatically preclude a storage appliance from copying data from one block on the Flash die to another block on the same Flash die. For example, the ARM core(s) may decide that the best source block and destination block are on the same die (e.g., assuming that the source Flash die is not in some state, such as a cautious mode, which prevents that from occurring).

Different applications supported by the storage appliance have different needs, for example with respect to how they interface to lower-level entities. The following figure shows an example of how this may be handled by the storage appliance.

Figure 5:
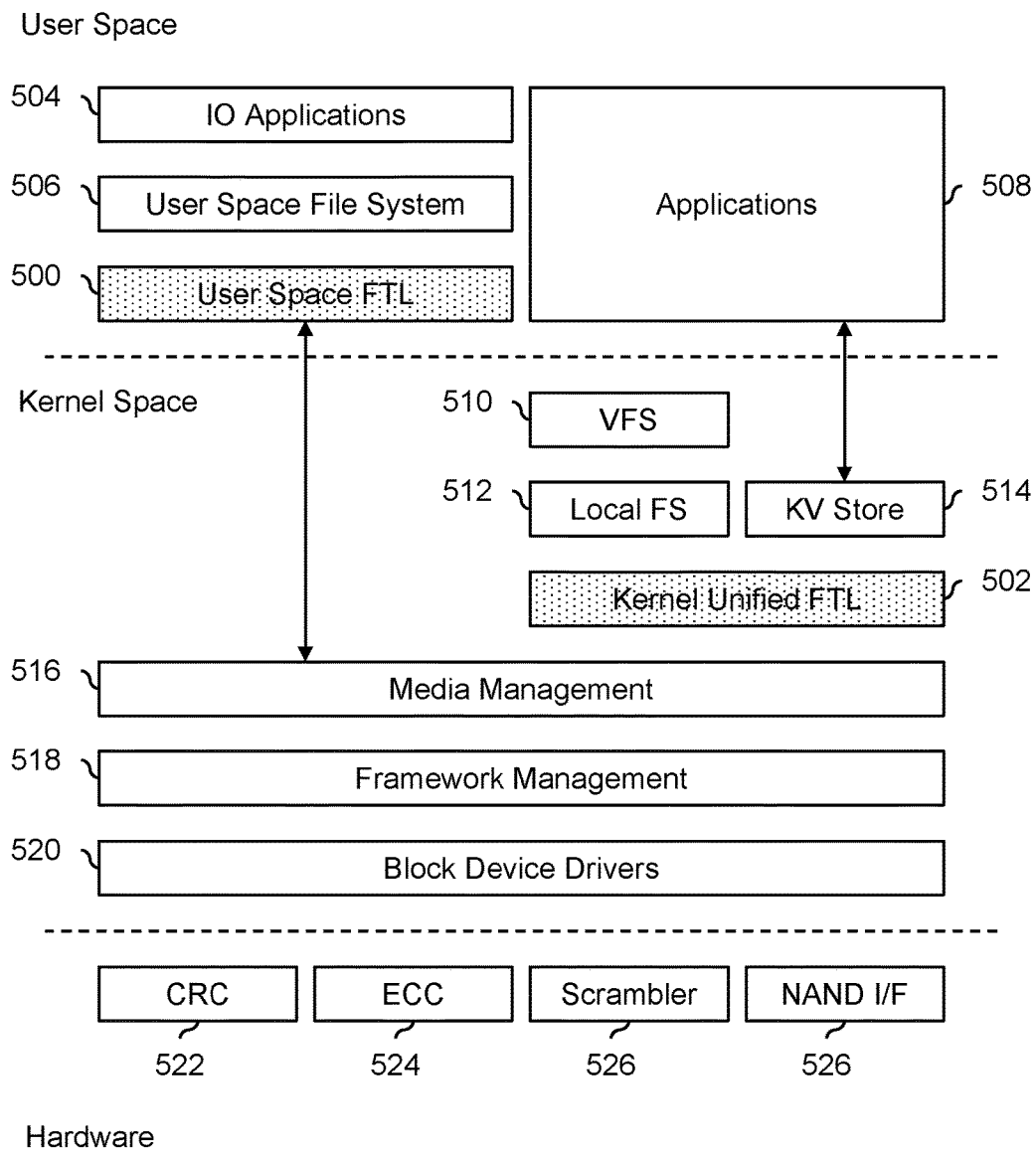
FIG. 5 is a diagram illustrating an embodiment of an IO stack for a storage appliance which manages FTL information at the host level.

FIG. 5 is a diagram illustrating an embodiment of an IO stack for a storage appliance which manages FTL information at the host level. In the example shown, the host-based FTL is implemented in user space (see, e.g., user space FTL 500) as well as kernel space (see, e.g., kernel unified FTL 502).

IO applications (504) are applications that go through a user space file system (506). The user space file system communicates with the user space FTL where translation or mapping between logical addresses (e.g., used by the IO applications) and physical addresses is performed.

On the right hand side of the diagram, applications 508 directly go to kernel space (e.g., as opposed to going through the user space file system). The kernel space includes virtual file system (VFS) 510, local file system 512 (e.g., ext4), key-value store 514, and the kernel unified FTL. In some applications this direct communication between the key-value store and the kernel unified FTL is desirable because it reduces latency and/or write amplification.

The kernel space also includes media management 516, framework management 518, and block device drivers 520. Those layers are used by both the user space and kernel paths. As shown here, FTL information associated with IO applications 504 is stored in user space FTL 500 and FTL information associated with applications 508 is stored in kernel unified FTL 502. In some embodiments, one of media management 516, framework management 518, and block device drivers 520 tracks which physical addresses correspond to which set of FTL information (e.g., so that when a physical address is traveling upward through block device drivers 520, framework management 518, and media management 516 (e.g., in that order), it is known whether to send that physical address to either the user space FTL or kernel unified FTL, whichever is appropriate).

Below the kernel space is the hardware. In this example, the hardware includes cyclic redundancy check (CRC) 522, error correction coding (524), scrambler 526, and NAND Flash interface 526 which are implemented in hardware, such as an FPGA. In one example, the CRC, ECC, and scrambler are implemented in an FPGA. Other types of IP such as compression and RAID are implemented in a SoC (e.g., ASIC).

The following figures describe an exemplary write process and an exemplary read process in more detail.

Figure 6:
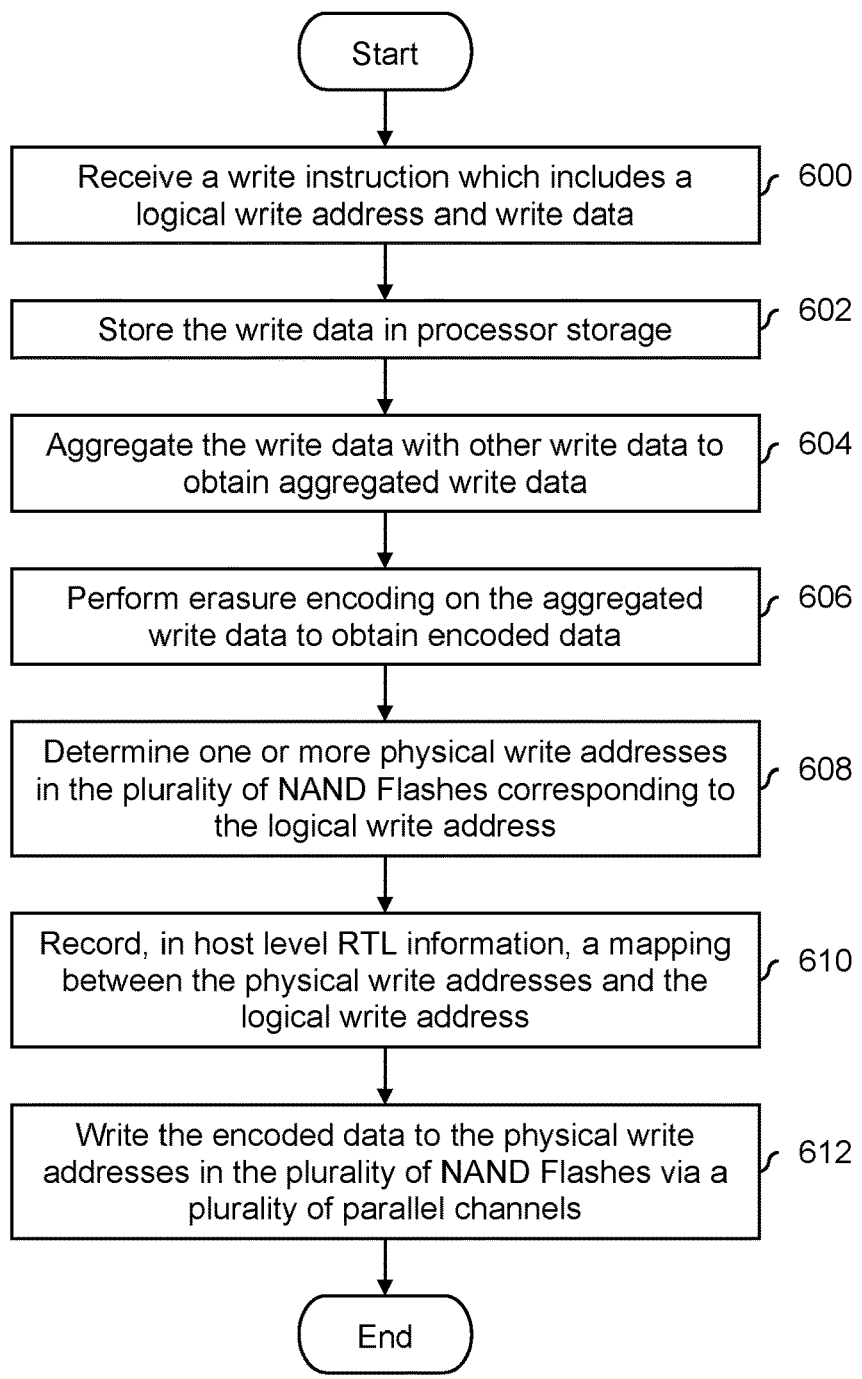
FIG. 6 is a flowchart illustrating an embodiment of a write process performed by a storage appliance.

FIG. 6 is a flowchart illustrating an embodiment of a write process performed by a storage appliance. As an example of components or devices which may perform this process, one or more of ARM cores 202 in FIG. 2 and/or one or more of ARM cores 300 in FIG. 3 may perform this process. The process of FIG. 6 may be repeated as more write instructions are received.

At 600, a write instruction which includes a logical write address and write data is received. As FIG. 1 shows, the write instruction may be received via a network from a plurality of data-generating devices (that is, the storage appliance supports multiple data-generating devices). As shown in FIG. 5, the write instruction may come through user space or kernel space.

At 602, the write data is stored in processor storage. For example, in FIG. 2, write data may be stored temporarily in DRAM 204 before being written to NAND Flash 206. Or, in FIG. 3, the write data may be stored temporarily in DRAM 302 before being written to AIC (i.e., NAND Flash) 308a-308c.

At 604, the write data is aggregated with other write data to obtain aggregated write data. For example, an application and/or data-generating device may send write data as small as 1 kB to the storage appliance. However, the interface to NAND Flash may support larger write sizes, such as 16 kB. The write data in this example is stored temporarily in processor storage (e.g., DRAM connected to the ARM cores) until enough write data is available to fill a write to the NAND Flash.

At 606, erasure encoding is performed on the aggregated write data to obtain encoded data. For example, suppose there are m chunks or units of aggregated write data. The erasure encoding (at least in this example) generates k chunks of parity information so that there is now a total of n chunks where n=m+k. In this example the erasure encoding is a systematic encoding process where the application or user data is copied in the encoded data (e.g., the encoded data is m chunks of application or user data plus k chunks of parity information appended).

At 608, one or more physical write addresses in the plurality of NAND Flashes corresponding to the logical write address are determined. For example, the physical address(es) is/are where the encoded data is actually stored in the NAND Flash. As will be described in more detail below, to more quickly and efficiently write to the NAND Flash, the encoded data may be spread out over multiple NAND Flash and/or AIC and therefore the physical addresses correspond to different NAND Flash and/or AIC.

At 610, a mapping between the physical write addresses and the logical write address is recorded in host level FTL information. For example, this recorded information is used to look up the appropriate physical addresses in the NAND Flash to access when a corresponding read instruction is received. In the example of FIG. 5, the information would be recorded in user space FTL 500 or kernel unified FTL 502 depending upon whether the write instruction came from IO applications 504 or from applications 508. In some embodiments, multiple (e.g., redundant) copies or versions of the mapping between the logical addresses and physical addresses are recorded (e.g., one copy on the NAND Flash itself and another copy in a collection of FTL (e.g., in user space or kernel space)).

At 612, the encoded data is written to the physical write addresses in the plurality of NAND Flashes via a plurality of parallel channels. To continue the example from above, assume that encoding at step 606 has produced n chunks. In the example of FIG. 3, a first chunk is written to NAND Flash/AIC 308*a*, a second chunk is written to NAND Flash/AIC 308*b*, and so on. Since each NAND Flash/AIC has an independent channel (e.g., the PCIe slots), the data can more quickly be written to NAND Flash.

Figure 7:
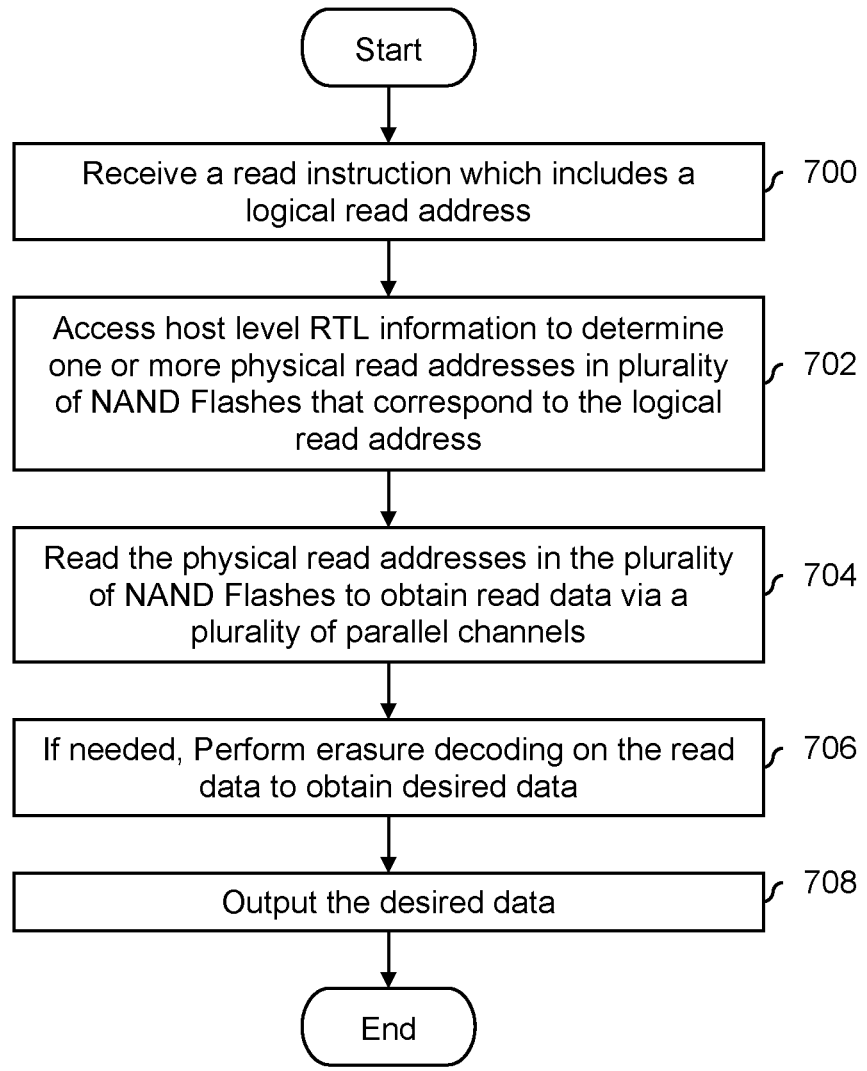
FIG. 7 is a flowchart illustrating an embodiment of a read process performed by a storage appliance.

FIG. 7 is a flowchart illustrating an embodiment of a read process performed by a storage appliance. As before, the process may be performed by one or more ARM cores.

At 700, a read instruction which includes a logical read address is received. As before, the read instruction may be received via a network from a plurality of data-generating devices (see, e.g., FIG. 1) and/or the read instruction may be received via user space or kernel space (see, e.g., FIG. 5).

At 702, host level FTL information is accessed to determine one or more physical read addresses in plurality of NAND Flashes that correspond to the logical read address. For example, this is where the desired data is actually stored in NAND Flash 206 in FIG. 2 or in AIC (i.e., NAND Flash) 308*a*-308*c* in FIG. 3.

At 704, the physical read addresses in the plurality of NAND Flashes are read to obtain read data via a plurality of parallel channels. To use the same example from above, there may be n chunks of data total where m chunks are the desired data and k chunks are parity and each chunk is read separately from an independent channel (e.g., one chunk from AIC/NAND Flash 308*a*, another chunk from AIC/NAND Flash 308*b*, and so on).

At 706, if needed, erasure decoding is performed on the read data to obtain desired data. For example, the erasure decoding may ensure or otherwise verify that the desired data part of the read data does not contain any errors. To continue the example from above, the erasure decoding may produce m chunks or units of user or desired data from n chunks of encoded or stored data. In one example, there is a CRC on the user part (e.g., the m chunks of desired data described above), so the user part is read first and its CRC is checked. If this CRC check passes, this user part is asserted to be correct and the corresponding parity part (e.g., the k chunks described above) is not read. Otherwise, the corresponding parity is read in order to obtain the desired user data using erasure decoding.

At 708, the desired data is output. For example, this may include returning the desired data to either IO applications 504 or applications 508 in FIG. 5 and/or returning the desired data to the appropriate data-generating device (104) in FIG. 1.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A device, comprising:
   a plurality of NAND Flashes;
   a programmable circuit coupled to the plurality of NAND Flashes and configured to perform one or more logic functions associated with storage operations performed on the plurality of NAND Flashes;
   a set of one or more processors configured to perform one or more translations between one or more logical addresses and one or more physical addresses in response to a request to access the plurality of NAND Flashes, wherein:
      the set of one or more processors is associated with a host;
      the set of one or more processors is further configured to manage Flash translation layer (FTL) information at the host level; and
      the FTL information at the host level includes: (1) FTL information associated with user space and (2) FTL information associated with kernel space; and
   a communication interface coupled to the programmable circuit and configured to transfer data destined to or originating from the plurality of NAND Flashes.

2. The device of claim 1, wherein the programmable circuit includes a field-programmable gate array (FPGA).

3. The device of claim 1, wherein the logic functions include one or more of the following: compression, deduplication, redundant array of independent disks (RAID) related processing, and/or erasure coding.

4. The device of claim 1, wherein the communication interface includes a network interface card (NIC).

5. The device of claim 1, wherein:
   the plurality of NAND Flashes include a plurality of add-in cards (AICs); and
   the programmable circuit and the plurality of NAND Flashes are coupled by inserting the plurality of add-in cards into a plurality of Peripheral Component Interconnect Express (PCIe) slots.

6. The device of claim 1, wherein:
   the plurality of NAND Flashes include a plurality of add-in cards (AICs); and
   a first NAND Flash die in the plurality of NAND Flashes is included in a first AIC in the plurality of AICs; and
   a second NAND Flash die in the plurality of NAND Flashes is included in a second AIC in the plurality of AICs.

7. The device of claim 1, wherein:
   the plurality of NAND Flashes include a plurality of add-in cards (AICs); and
   the set of one or more processors is further configured to:
      track a free block metric associated with a first NAND Flash die in the plurality of NAND Flashes, wherein the first NAND Flash die is included in a first AIC in the plurality of AICs;
      determine if the free block metric exceeds a minimum; and
      in the event it is determined that the free block metric does not exceed the minimum, copy data from a first block in the first NAND Flash die to a second block in a second NAND Flash die, wherein the second NAND Flash die is included in a second AIC in the plurality of AICs.

8. The device of claim 1, wherein the set of one or more processors is further configured to:
   receive a write instruction which includes a logical write address and write data;
   store the write data in processor storage;
   aggregate the write data with other write data to obtain aggregated write data;
   perform erasure encoding on the aggregated write data to obtain encoded data;
   determine one or more physical write addresses in the plurality of NAND Flashes corresponding to the logical write address;
   record, in host level FTL information, a mapping between the physical write addresses and the logical write address; and
   write the encoded data to the physical write addresses in the plurality of NAND Flashes via a plurality of parallel channels.

9. The device of claim 1, wherein the set of one or more processors is further configured to:
receive a read instruction which includes a logical read address;
access host level FTL information to determine one or more physical read addresses in plurality of NAND Flashes that correspond to the logical read address;
read the physical read addresses in the plurality of NAND Flashes to obtain read data via a plurality of parallel channels;
if needed, perform erasure decoding on the read data to obtain desired data; and
output the desired data.

10. A method, comprising:
using a programmable circuit coupled to a plurality of NAND Flashes to perform one or more logic functions associated with storage operations performed on the plurality of NAND Flashes;
using a set of one or more processors to perform one or more translations between one or more logical addresses and one or more physical addresses in response to a request to access the plurality of NAND Flashes, wherein:
the set of one or more processors is associated with a host;
the method further includes using the set of one or more processors to manage Flash translation layer (FTL) information at the host level; and
the FTL information at the host level includes: (1) FTL information associated with user space and (2) FTL information associated with kernel space; and
using a communication interface coupled to the programmable circuit to transfer data destined to or originating from the plurality of NAND Flashes.

11. The method of claim 10, wherein the programmable circuit includes a field-programmable gate array (FPGA).

12. The method of claim 10, wherein the logic functions include one or more of the following: compression, deduplication, redundant array of independent disks (RAID) related processing, and/or erasure coding.

13. The method of claim 10, wherein the communication interface includes a network interface card (NIC).

14. The method of claim 10, wherein:
the plurality of NAND Flashes include a plurality of add-in cards (AICs); and
the programmable circuit and the plurality of NAND Flashes are coupled by inserting the plurality of add-in cards into a plurality of Peripheral Component Interconnect Express (PCIe) slots.

15. The method of claim 10, wherein:
the plurality of NAND Flashes include a plurality of add-in cards (AICs); and
a first NAND Flash die in the plurality of NAND Flashes is included in a first AIC in the plurality of AICs; and
a second NAND Flash die in the plurality of NAND Flashes is included in a second AIC in the plurality of AICs.

16. The method of claim 10, wherein:
the plurality of NAND Flashes include a plurality of add-in cards (AICs); and
the method further includes using the set of one or more processors to:
track a free block metric associated with a first NAND Flash die in the plurality of NAND Flashes, wherein the first NAND Flash die is included in a first AIC in the plurality of AICs;
determine if the free block metric exceeds a minimum; and
in the event it is determined that the free block metric does not exceed the minimum, copy data from a first block in the first NAND Flash die to a second block in a second NAND Flash die, wherein the second NAND Flash die is included in a second AIC in the plurality of AICs.

17. The method of claim 10 further comprising using the set of one or more processors to:
receive a write instruction which includes a logical write address and write data;
store the write data in processor storage;
aggregate the write data with other write data to obtain aggregated write data;
perform erasure encoding on the aggregated write data to obtain encoded data;
determine one or more physical write addresses in the plurality of NAND Flashes corresponding to the logical write address;
record, in host level FTL information, a mapping between the physical write addresses and the logical write address; and
write the encoded data to the physical write addresses in the plurality of NAND Flashes via a plurality of parallel channels.

18. The method of claim 10 further comprising using the set of one or more processors to:
receive a read instruction which includes a logical read address;
access host level FTL information to determine one or more physical read addresses in plurality of NAND Flashes that correspond to the logical read address;
read the physical read addresses in the plurality of NAND Flashes to obtain read data via a plurality of parallel channels;
if needed, perform erasure decoding on the read data to obtain desired data; and
output the desired data.

19. A device, comprising:
a plurality of NAND Flashes;
a set of one or more processors coupled to the plurality of NAND Flashes and configured to perform one or more logic functions associated with storage operations performed on the plurality of NAND Flashes, as well as to perform one or more translations between one or more logical addresses and one or more physical addresses in response to a request to access the plurality of NAND Flashes, wherein:
the set of one or more processors is associated with a host;
the set of one or more processors is further configured to manage Flash translation layer (FTL) information at the host level; and
the FTL information at the host level includes: (1) FTL information associated with user space and (2) FTL information associated with kernel space; and
a communication interface coupled to the plurality of NAND Flashes, configured to transfer data destined to or originating from the plurality of NAND Flashes.

20. A computer program product, the computer program product being embodied in a non-transitory computer readable storage medium and comprising computer instructions for:
using a programmable circuit coupled to a plurality of NAND Flashes to perform one or more logic functions associated with storage operations performed on the plurality of NAND Flashes;

using a set of one or more processors to perform one or more translations between one or more logical addresses and one or more physical addresses in response to a request to access the plurality of NAND Flashes, wherein:

the set of one or more processors is associated with a host;

the computer program product further includes computer instructions for using the set of one or more processors to manage Flash translation layer (FTL) information at the host level; and the FTL information at the host level includes: (1) FTL information associated with user space and (2) FTL information associated with kernel space; and using a communication interface coupled to the programmable circuit to transfer data destined to or originating from the plurality of NAND Flashes.

21. The device of claim 19, wherein the set of one or more processors is further configured to:

receive a write instruction which includes a logical write address and write data;

store the write data in processor storage;

aggregate the write data with other write data to obtain aggregated write data;

perform erasure encoding on the aggregated write data to obtain encoded data;

determine one or more physical write addresses in the plurality of NAND Flashes corresponding to the logical write address;

record, in host level FTL information, a mapping between the physical write addresses and the logical write address; and write the encoded data to the physical write addresses in the plurality of NAND Flashes via a plurality of parallel channels.

22. The computer program product of claim 20 further comprising computer instructions for using the set of one or more processors to:

receive a read instruction which includes a logical read address;

access host level FTL information to determine one or more physical read addresses in plurality of NAND Flashes that correspond to the logical read address;

read the physical read addresses in the plurality of NAND Flashes to obtain read data via a plurality of parallel channels;

if needed, perform erasure decoding on the read data to obtain desired data; and output the desired data.

* * * * *